United States Patent [19]

Campbell et al.

[11] Patent Number: 5,391,656
[45] Date of Patent: Feb. 21, 1995

[54] RECOVERY OF UNREACTED MONOMERS IN AN OLEFIN POLYMERIZATION PROCESS

[75] Inventors: David W. Campbell, Luling, La.; Randall L. Force, South Charleston; Kelli L. Campbell, St. Albans, both of W. Va.

[73] Assignee: Union Carbide Chemicals & Plastics Technology Corporation, Danbury, Conn.

[21] Appl. No.: 127,259

[22] Filed: Sep. 24, 1993

[51] Int. Cl.$^6$ .............................................. C08F 2/34
[52] U.S. Cl. ........................................ 526/68; 526/901
[58] Field of Search ................................. 526/68, 901

[56] References Cited

U.S. PATENT DOCUMENTS

| | | | |
|---|---|---|---|
| 3,256,263 | 6/1966 | Wisseroth et al. | 260/94.9 |
| 4,258,158 | 3/1981 | Pfeiffer | 526/68 |
| 4,372,758 | 2/1983 | Bobst et al. | 526/77 |
| 4,623,704 | 11/1986 | Dembicki et al. | 526/68 |
| 4,666,998 | 5/1987 | Hagerty | 526/68 |
| 4,727,122 | 2/1988 | Lee et al. | 526/68 |

Primary Examiner—Joseph L. Schofer
Assistant Examiner—Tom Weber

[57] ABSTRACT

A method of recovering and recycling monomers from a gas phase olefins polymerization reactor through the use of the monomer feed stream. A high pressure monomer source is reduced in pressure so as to reduce the temperature of the monomer source. The monomer source is then used to cool and condense monomers contained in various vent gas streams. The condensed monomers are then separated from the gas stream and recycled back to the reactor.

8 Claims, 3 Drawing Sheets

5,391,656

RECOVERY OF UNREACTED MONOMERS IN AN OLEFIN POLYMERIZATION PROCESS

FIELD OF THE INVENTION

The invention relates to a method for recovering unreacted monomers from gas streams from an olefin polymerization process.

BACKGROUND OF THE INVENTION

Polymers and copolymers of $C_2$–$C_{10}$ olefins, particularly copolymers of ethylene and higher alpha-olefins are produced in gas phase, fluid bed reactors, see for example, Karol, et al. U.S. Pat. No. 4,302,566. In the fluid bed reactor, the monomer or monomers are provided to a fluid bed reactor at pressures slightly above the normal operating pressure of the reactor, which is typically around 200–350 psig. The monomer or monomers are frequently compressed to a pressure above the reaction pressure of the polymerization reactor in order to fed monomer to the polymerization reactor. However in some regions of the world, monomers are delivered to a polymerization facility at very high pressures, sometimes in excess of 1,000 psig. In these instances the monomer feed pressure is typically reduced to a pressure 50–100 psi above reaction pressure through a series of expansions. Reducing the pressure of the monomer feedstream through a series of expansions helps to improve control of the monomer feedstream and also helps to prevent pressure surges within the reactor.

After the monomer is fed into the reactor it reacts with a catalyst to form a polymer. The polymer is then discharged from the reactor. The resulting polymer may also contain gaseous unpolymerized hydrocarbon monomers. An inert gas, typically nitrogen, may also be added to the polymer product stream to aid in the transfer of the polymer product from the reactor and to reduce the risk of explosion if the hydrocarbon monomer content becomes excessive in the presence of oxygen. The polymer product is separated from the gas stream through the use well known methods and devices in the art, see for example U.S. Pat. No. 4,372,758. The gas stream, which still contains the various hydrocarbon monomers, can then be cooled to condense and remove as much of the monomer gases as possible. For economic considerations, it is desirable to recover the monomer gases and recycle the monomer gases to the reactor. Furthermore, environmental regulations require proper disposal of hydrocarbons, such as incineration or other suitable techniques, in order to meet emission standards.

Cooling water is sometimes employed to recover the monomer gases. However, cooling water is ineffective in recovering most of the monomers because the monomer gases condense at temperatures lower than the temperature of the cooling water. Refrigeration equipment is often necessary to chill water, brine or other suitable media used in the condensation and recovery of the hydrocarbon monomer gases. However, refrigeration equipment is expensive to install, expensive to operate and may be a significant operational problem due to extensive maintenance requirements.

Accordingly, a need exists to provide a reliable, inexpensive method for the recovery and recycle of condensable monomer gases from a gas phase fluidized bed reactor. Preferably, the cooling source should be readily available and inexpensive to operate.

SUMMARY OF THE INVENTION

The present invention provides a method which can be used to cool, condense and recover monomers so that they may be recycled back to the reactor rather than being incinerated. By recovering the monomer gases and recycling them back to the reactor, improved polymer product efficiencies are achieved.

The invention utilizes the cooling effect the expansion of the monomer feed creates as a means to absorb heat. The expanded monomer feed is then introduced into the gas phase fluid bed reactor and reacted using methods known in the art. The monomer is expanded prior to being fed to the reactor and used in indirect heat exchange to recover monomers contained in various gas streams. The use of the expanded monomer feedstream may reduce or eliminate the need for refrigeration systems within monomer recovery processes.

The method of the present invention comprises:
 (a) providing a monomer source under pressure;
 (b) reducing the pressure of said monomer source thereby reducing the temperature of the monomer source;
 (c) providing a source of condensable gases;
 (d) condensing at least a portion of said condensable gases through indirect heat exchange with the reduced pressure monomer;
 (e) separating said condensed liquids from the gas stream;
 (f) recovering said condensed liquids; and
 (g) feeding said monomer source to a gas phase fluid bed olefin reactor.

The expansion of the monomer stream may cause a portion of the monomer stream to liquefy. In a preferred embodiment of the present invention, partially liquefied monomer is created by the expansion of the monomer feedstream. The partially liquefied monomer feedstream is then sufficiently heated through indirect heat exchange with the various condensable gas-containing streams so as to vaporize all of the monomer in the feedstream. Vaporizing all of the monomer feed stream is preferable, inasmuch as it maximizes the cooling effect of the expansion, by utilizing the entire heat of vaporization of the liquid, while also allowing the monomer feed stream to be directly fed to the gas-phase reactor without having to heat the monomer.

DETAILED DESCRIPTION OF THE DRAWINGS

DETAILED DESCRIPTION OF THE INVENTION

The present invention can be used in conjunction with a process for polymerization or copolymerization of $C_2$–$C_{10}$ olefins. In the preferred embodiments, the invention is used in the polymerization of ethylene and propylene or the copolymerization of ethylene and propylene with higher olefins.

Figure 1:
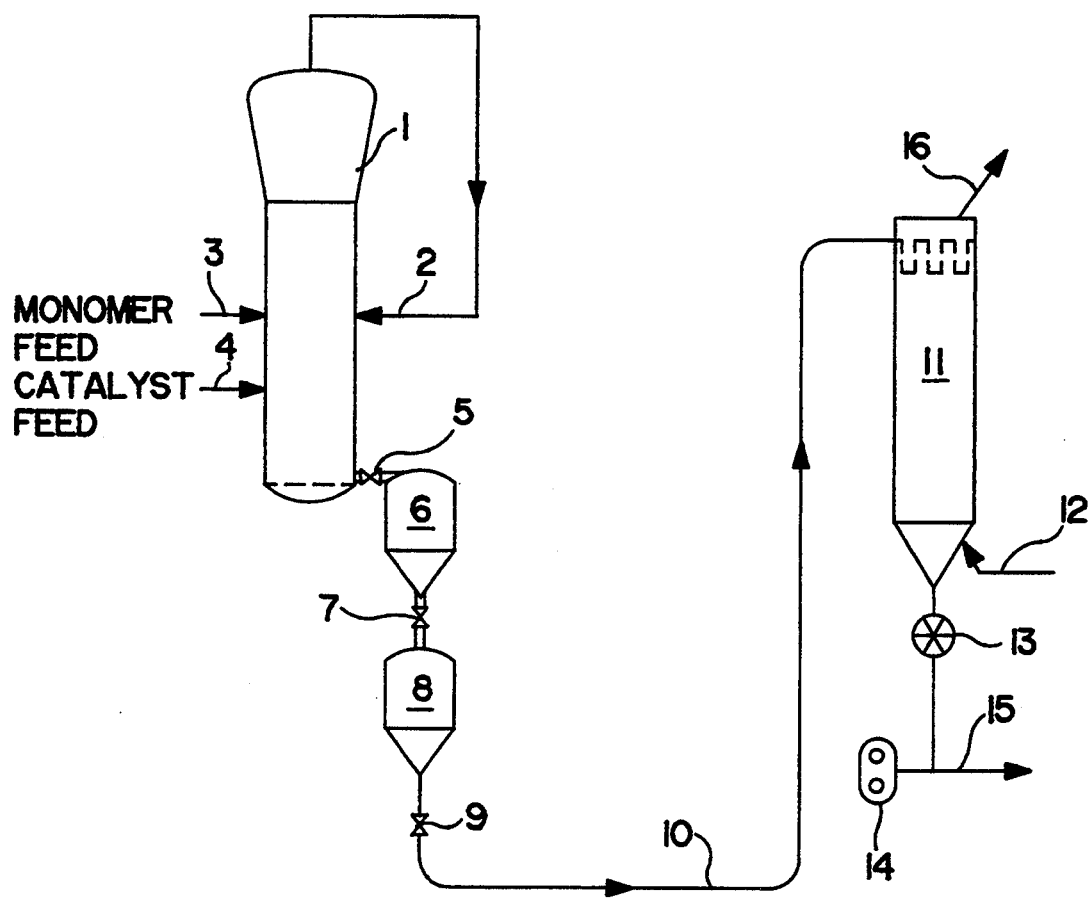
FIG. 1 is a schematic diagram of a gas phase fluid bed reactor.

The operation of a prior art gas phase, fluid bed polymerization process is presented in FIG. 1. The present invention is schematically presented in FIGS. 2a and 2b.

Referring to FIG. 1, monomer 3 and catalyst 4 are provided to a gas-phase fluidized bed reactor 1. A recycle stream 2 is also present to recycle unreacted reactor components back to the reactor. Polymer and some reactor gases are withdrawn from the reactor through valve 5 and conducted to a first product chamber 6, through valve 7 and into a product blow tank 8. The reactor contents pass through valve 9 and are conveyed through conduit 10 to a product separator 11. Within the product separator the solids from the reactor, i.e. the polymer, are separated from the reactor gases. The polymer is purged with an inert gas, typically nitrogen, fed through line 12 and fed through valve 13 into a product conveying line 15. A compressor 14 is employed to convey the polymer to the product handling and storage area. Alternatively, the product can be pelletized in a dose-coupled pelletizing system. Reactor gases and inert gas, collectively referred to herein, as product purge bin gases, are removed from the product separator through conduit 16 and are typically sent to a flare to be incinerated or to a monomer recovery operation. If the product purge bin gases are incinerated a substantial amount of reactor gas, containing various amounts of monomers and solvents are lost resulting in efficiency losses. Alternatively, a refrigeration system would be necessary to condense and separate the monomers contained in the product purge bin gas stream from the non-condensable gases.

Throughout this disclosure reference will be made to product purge bin reactor gas and the condensation and recovery of monomer gases contained within this stream. While this gas stream is used to illustrate the present invention, those with ordinary skill in the art will readily appreciate the applicability of the invention to other gas streams which contain monomer gases that are to be cooled, condensed and recovered.

Figure 2A:
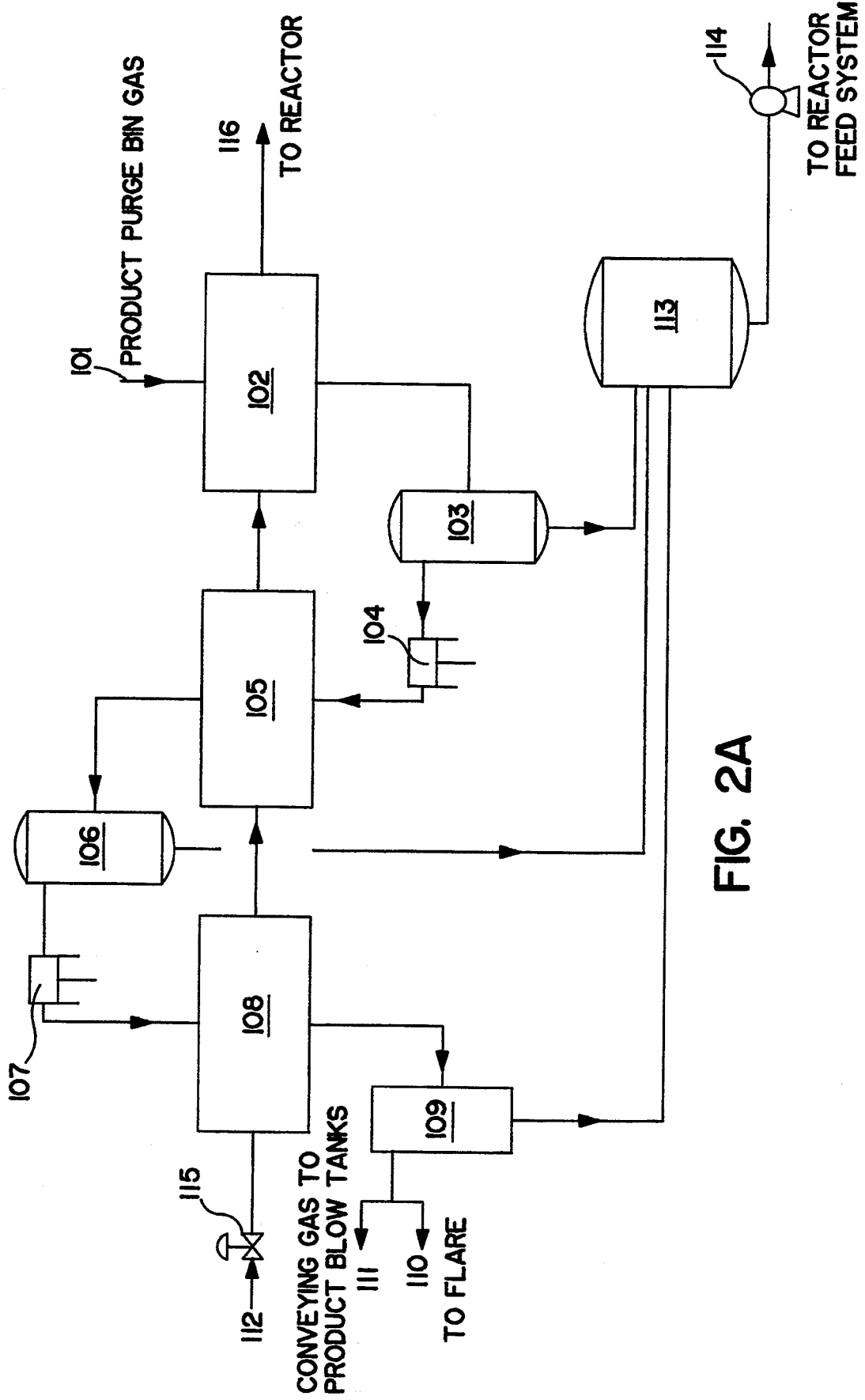
FIG. 2a is a schematic diagram of the indirect heat exchange between the monomer feed stream and the condensable gas-containing stream.

Referring to FIG. 2a, a gas stream 101 containing various monomers, typically at a pressure ranging from about 0.5 pounds per square inch gauge (psig) to about 20 psig and a temperature of from 50° C. to about 110° C., such as the product purge bin gas stream, is cooled in a heat exchanger 102 to about −10° C. to partially condense a portion of the reactor gas stream. The product purge bin gas stream is then directed to a liquid/gas separator 103 to separate the condensed liquids such as hexene, hexane, butene, isopentane and the like from the remaining non-condensable gases. The liquids are removed and sent to a recovered monomer tank 113. The condensed monomers are sent to the reactor feed system, or a monomer purification system, if necessary, by pump 114. The non-condensable gases are then compressed by a compressor 104 to a pressure of from about 30 psig to about 90 psig and a temperature of from 50° C. to about 200° C. and sent to a second heat exchanger 105 to be further cooled to a temperature of about 40° C. The intermediate pressure gas stream created by the discharge of compressor 104 is then sent to a second liquid/gas separator 106 in which the condensed gases are removed. The non-condensable gases are then fed to a second compressor 107, having a temperature of from about 30° C. to about 200° C. and a pressure range of from about 120 psig to about 300 psig before being conveyed into a third heat exchanger 108. Any condensed liquids formed in heat exchanger 108 are then removed in a liquid/gas separator 109 and sent to a recovered monomer tank 113. Any product purge bin gases not condensed in the process are then typically sent to a flare 110 or used as a conveying gas for the product blow tanks 8 (as depicted in FIG. 1).

Those with ordinary skill in the art will recognize that additional compressors, liquid/gas separators, heat exchangers etc. can be added to the above method without departing from the spirit of the invention. For simplicity, multiple pumps and multiple recovered monomer tanks are not depicted in FIG. 2a. Pumps, compressors and additional equipment will be necessary depending on the final design which is selected. The selection and specification of the type of equipment needed for a particular design is within the ability of a person with ordinary skill in the art.

Still referring to FIG. 2a, the monomer feed stream 112 at a pressure of from about 1000 psig to about 1600 psig and temperature of from 0° C. to about 25° C. is expanded at the expansion station 115 to create the reduced pressure monomer feed stream having a pressure range of from 350 psig to 450 psig and a temperature of from about −10° C. to about −20° C. The reduced pressure monomer feed stream is preferably fed to the various heat exchangers so that the highest pressure reactor gases are contacting the coldest monomer feed source. This enables the low boiling gases to be indirectly contacted with the coldest monomer feed stream. In each successive heat exchanger the monomer feed stream is warmer than in the previous heat exchanger. Preferably, any liquefied monomer created by the expansion of the monomer feed stream is vaporized to recover the heat of vaporization of the monomer and maximize the amount of condensable gases recovered by the process. Preferably, the monomer feed stream is on the shell side of the heat exchangers. The monomer feed stream is then fed to the gas phase fitted bed reactor through conduit 116.

Figure 2B:
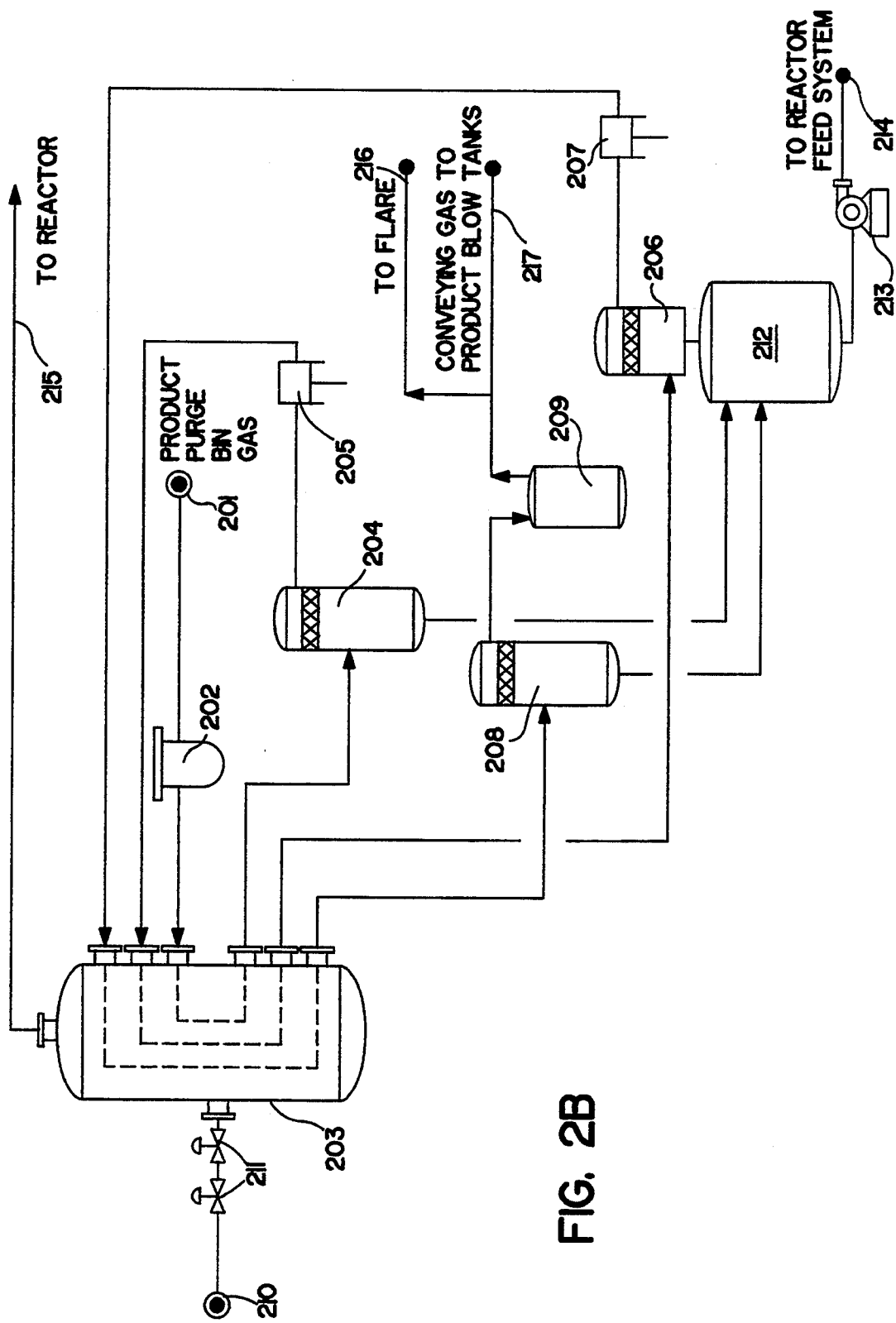
FIG. 2b is a schematic diagram of a preferred embodiment of indirect heat exchange between the monomer feed stream and the condensable gas-containing stream.

A preferred embodiment of the present invention is presented in FIG. 2b. A triple pass heat exchanger is employed to cool the product purge bin gases 201 in a single heat exchanger 203. On the shell side of the exchanger, the expanded monomer feed, preferably a partially liquefied monomer gas is supplied, while in the tube side of the heat exchanger the reactor gases are cooled and condensed. This embodiment of the invention is preferred because a single heat exchanger is employed rather than multiple heat exchangers. Furthermore in the method of the invention depicted in FIG. 2b, all of the reactor gases are in indirect heat exchange with the partially liquefied monomer feed gas which is the coldest stream created by the expansion of the monomer gas.

Still referring to FIG. 2b, the product purge bin gas stream at a temperature of from about 50° C. to about 110° C. and a pressure of from 0.5 psig to about 20 psig is provided to an optional filter 202 and then to the low pressure tubes of a multipass heat exchanger and cools it to a temperature to of from about −5° C. to about −10° C. Any condensable gases are then separated from the gas stream in the low pressure liquid/gas separator 204. The remaining gas stream is compressed by a compressor 205 which provides the product purge bin gas stream to the intermediate pressure tubes of the heat exchanger. The gases are then cooled to a temperature of from approximately −5° C. to about −10° C. Any condensed gases are separated from the gas stream in the intermediate pressure separator 206. The remaining product purge bin gases, are compressed again by a second compressor 207 and sent to the high pressure tubes of the heat exchanger. The condensed gases are cooled to a temperature of from −5° C. to about −10° C. and then removed from the product purge bin gas stream in the high pressure separator 208 and the non-condensable gases are then sent to an optional surge tank 209 and then sent to a flare 216. Alternatively, the gas stream could be sent to the product handling area 217 for further use of the gas stream which is not shown for simplicity.

If further refrigeration is available, the gas stream could then be further cooled and compressed so as to recover a higher percentage of any monomer remaining in the product purge bin gas stream. The use of the present invention in combination with refrigeration system will reduce the heat load on the refrigeration system thereby requiring less energy to operate the refrigeration system than a refrigeration system not employing the method of the recent invention.

On the shell side of the heat exchanger of FIG. 2b is the monomer source 210 which has been expanded from about 1200 psig and 18° C. to about 430 psig in an expansion station 211 and cooled to a temperature of about −12.5° C. After cooling the various gas streams, the monomer source is then feed to the gas phase fluid bed reactor through conduit 215. As in FIG. 2a, a single recovered monomer tank 212 is depicted in FIG. 2b. The recovered monomers are then recycled to the reactor through pump 213 and conduit 214. For simplicity, other necessary equipment, such as pumps, are not shown in FIG. 2b.

The monomer source can be expanded to as low a pressure as feasible. For economic reasons, it is undesirable to have to compress the monomer in order to feed it to the reactor. Preferably, a 50 to 100 pounds per square inch pressure differential between the expanded monomer gas source and the reactor pressure is maintained to feed the monomer to the reactor. Most preferably, the pressure of the monomer source is reduced to as low a pressure as possible so as to maximize the cooling effect of the expansion and to provide as low a temperature monomer feed stream as possible. For example, if the monomer supply pressure is about 800 to 1000 psig and the reactor pressure is about 300 psig then expansion of the monomer supply stream to about 350 to 400 psig would advantageously recover most of the cooling effect of the expansion while not requiring further recompression of the monomer feed gas to supply it to the reactor.

The present invention preferably employs a large volume monomer source for cooling. In most instances, the monomer is ethylene or propylene, but other monomer sources may also be expanded and used as a cooling source without departing from the spirit of the invention.

Depending upon many variables, including but not limited to the discharge pressure created by the compressors, the initial pressure of the monomer source, the final pressure to which the monomer source is expanded, how much of the monomer source is liquefied, and the heat of vaporization of the monomer source, will determine how much and what monomers are recovered by the method of the invention. The present invention is ideally suited for the recovery of the higher boiling components from the product purge bin gas stream. These components include hexane, pentane, butene, isobutene, isopentane, 4-methyl 1-pentane, octane and the like. The ability to condense and recover these monomers is based upon the operating temperatures and pressures of the system. Lower boiling components, such as ethylene and propylene, may also be condensed and recovered by the method of the invention. Condensing the low temperature boiling components will generally require that higher pressure systems are employed.

The Example which follows is presented for the purpose of illustrating the invention and are not to be construed as unduly limiting the claims. All parts and percentages are by weight unless otherwise specified.

EXAMPLE 1

Ethylene was introduced into a system at high pressures, 1200 pounds per square inch gauge and was reduced in pressure through a series of valves to approximately 430 psig. The result was a mixture of ethylene liquid and vapor which is approximately 62% liquid/38% vapor and had a temperature of approximately −12.5° C. The liquid/vapor ethylene mixture was fed to the shell side of a heat exchanger.

A monomer-containing vent gas was provided to a triple pass, heat exchanger, similar to the one depicted in FIG. 2b. The vent gas was initially cooled to a temperature of −5° C. Approximately 850 pounds of condensate was collected, which was comprised primarily of hexene. The remaining gas stream was then compressed to approximately to 50 psig and then cooled by the intermediate tubes of the heat exchanger to approximately −5° C. Approximately 800 pounds of condensate, hexene and butene were condensed, separated from the gas stream and sent to a recovery tank. The remaining gas was then compressed again to approximately 235 psig and then sent to the high pressure tubes of the heat exchanger and cooled again. Approximately 200 pounds of condensable gases, primarily hexene, hexane, isopentane and/or butene were collected and removed from the stream. The remaining non-condensable gases were sent to a flare for incineration.

We claim:

1. A method of recovering condensable gases from a gas phase fluid bed olefin polymerization reactor comprising:
    a) providing a monomer source under pressure;
    b) reducing the pressure of said monomer source thereby reducing the temperature of the monomer source;
    c) providing a source of condensable gases consisting essentially of condensable monomers and/or hydrocarbon solvents;
    d) condensing at least a portion of said condensable gases to a liquid through indirect heat exchange with the reduced pressure monomer source;
    e) separating said liquid from the condensable gases;
    f) recovering said liquid; and
    g) feeding said monomer source to a gas phase fluid bed olefin reactor.

2. The method of claim 1 wherein the remaining gas stream obtained after separation from the liquid is compressed and cooled again through indirect heat exchange with the monomer source.

3. The method of claim 2 wherein the indirect heat exchange between the monomer source and the remaining gas stream is conducted in the same vessel as the indirect heat exchange conducted between the high pressure monomer source and the condensable gases.

4. The method of claim 1 wherein the monomer source is initially at a pressure of between 800 and 1000 psig and is then expanded to reduce the pressure of the monomer source to about 350 to about 450 psig.

5. The method of claim 1 wherein the monomer source is ethylene.

6. The method of claim 1 wherein the gas phase olefin reactor is producing an ethylene homopolymer or co-polymer.

7. The method of claim 1 wherein the gas phase olefin reactor is producing a propylene homopolymer or co-polymer.

8. The method of claim 1 wherein the monomer source is partially liquefied when expanded.

* * * * *